Patented Apr. 22, 1941

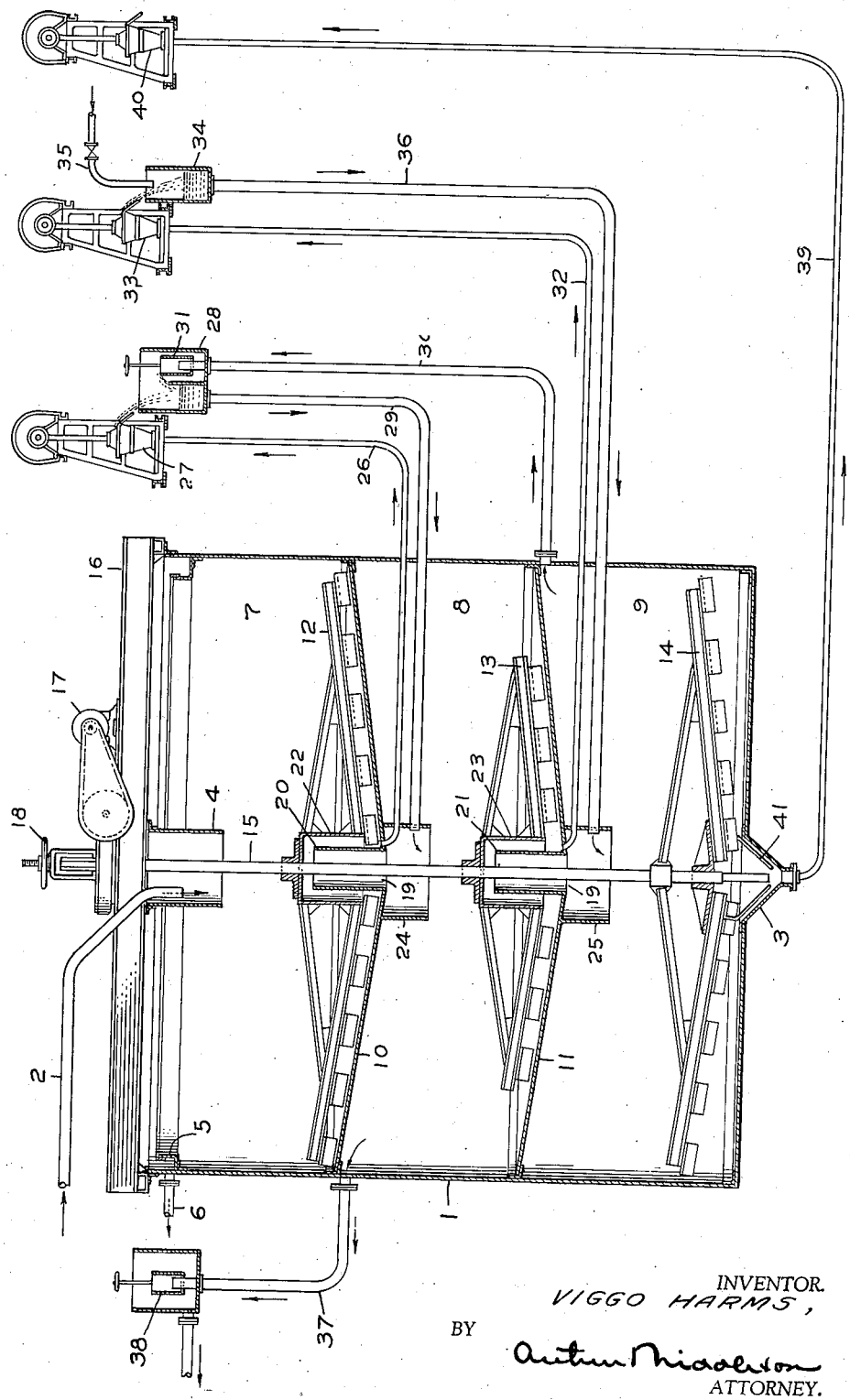

2,239,604

UNITED STATES PATENT OFFICE 2,239,604

SEDIMENTATION APPARATUS

Viggo Harms, The Hague, Netherlands, assignor to The Dorr Company, Inc., New York, N. Y., a corporation of Delaware Application January 6, 1938, Serial No. 183,619
In Great Britain January 8, 1937

6 Claims. (Cl. 210—55)

This invention relates to the treatment of liquid-solids mixtures and is particularly concerned with the washing of solid material in fluid suspension in a series of operations comprising a thickening or sedimentation step followed by the treatment of the thickened material with a wash liquid. The invention is of wide application and may be employed, to give a few examples only, in causticizing plants for washing out caustic liquors, in gold recovery by the cyanide process and for separating soluble materials from pigments.

Operations of the above character have previously been carried out by the use of a series of thickeners and washing tanks (or repulpers) the sludge from the first thickener being treated in a washing and mixing tank and passed to a second thickener, the overflow from which is used as washing liquid in the previous washing tank, and so on throughout the series.

Proposals have been made to place the thickening tanks in a vertical or superposed series forming a single tank structure divided into thickener compartments by horizontal partitions, the rakes for the several thickeners being mounted on a rotatable vertical shaft which passes through glands in the said partitions. These glands are liable to give trouble and the arrangement also has the disadvantage that under certain conditions excessive loads may be placed on the partitions due to the withdrawal of liquid from a lower compartment. This involves a heavy and expensive construction and increased difficulty in maintaining the sealing action of the glands.

It has also been proposed to construct a washing thickener apparatus as a vertical series of thickener compartments in which sludge from one compartment passes through an aperture in the bottom thereof into a trap carried by the vertical rotating rake shaft and is there mixed with wash liquid provided by the overflow of the next lower compartment, the mixture being allowed to overflow from the trap into said lower compartment and so on through the series. With such an arrangement it is difficult to secure satisfactory and complete washing of the solids in the traps, since even if stirring devices are provided these can only rotate at the necessarily slow speed of the rakes. Moreover by relying on gravity alone for the passage of sludge from one compartment to the next the sludge dilution will vary as it cannot be controlled, whereas for efficient washing it is essential to withdraw from each thickener compartment not only a thick sludge but a sludge having a constant dilution.

Another disadvantage of the arrangement referred to is that the sludge transfer takes place at a point which is entirely inaccessible, i. e. at the centre of the compartment, so that it is impossible to observe whether the thickening and washing is proceeding satisfactorily or to clear any overload which might occur. Also when an overload occurs it is exceedingly difficult to determine in which of the compartments the cause is to be found. It is an object of the invention to provide an improved thickening and washing apparatus for the purpose described which while being of compact and relatively inexpensive construction is not subject to the disadvantages pointed out above. Another object is to provide for close control and observation of the thickened material and the washing process at each stage. A further object is to provide a thickening and washing apparatus which is more economical than the previously employed arrangements using separate thickeners and counter-current washing. A further object is to provide a thickening and washing apparatus in which there is direct communication between the superposed thickening compartments so that overloading of the individual partitions or decks is impossible while at the same time permitting considerable variations in the level of settled material in the compartments without affecting the stagewise transfer of the said material.

Other objects and advantages will be pointed out as the description proceeds or will be obvious to those familiar with the art to which this invention relates.

According to the invention the pulp or suspension to be treated is fed in succession through a series of superposed sedimentation compartments having rotatable rakes or scrapers for thickening material settled in the compartments, means for preventing direct transfer of settled material from an upper compartment to a lower compartment, and means for withdrawing settled material from one or more of the compartments to an external treatment stage where it is washed or diluted and returned as feed to a succeeding sedimentation compartment.

According to a feature of the invention the settled material is withdrawn by pump means and the overflow from a subsequent sedimentation compartment is employed as the washing liquid.

According to a further feature of the invention the pressure of the material in one compartment is balanced by the hydrostatic pressure of the overflow from a subsequent compartment of the series and in one arrangement the settled material withdrawn from the first or upper compartment is mixed with the overflow from the third or lower compartment of the series.

The invention also consists in a thickening and washing apparatus comprising a superposed series of sedimentation chambers in direct hydraulic communication, means for preventing transit of settled material through the communication, there being a mechanical or pump means for withdrawing settled material from a chamber and discharging the same into a mixing or washing device communicating with a succeeding chamber and fed with wash liquid from the overflow of a subsequent chamber, the said device being located at a height such that the mixture will be fed by gravity into the appropriate chamber. According to a further feature of the invention, the overflow of wash liquid from the subsequent compartment is controlled by a telescopic tube arrangement.

The hydraulic communication between the superposed chambers or compartments may be provided by a central aperture in the horizontal partitions or decks through which the shaft carrying the solids raking devices passes, there being a wall or boot of substantial height rising from or surrounding the said apertures to prevent the direct transfer of solids from the deck of one compartment to the next lower compartment. The sludge rakes are preferably carried by a bell or cage-like structure mounted on the vertical shaft and arranged to clear the wall or boot referred to above.

The withdrawal of the sludge from the thickeners or sedimentation chambers may be effected by any suitable mechanical means but it is preferred to use reciprocating pumps of the flexible diaphragm type.

The invention will be better understood by reference to the following example.

The figure of the accompanying drawing represents more or less diagrammatically a washing tray thickener constructed in accordance with the invention and having three compartments.

Referring to the drawing which illustrates by way of example one convenient mode in which the invention may be carried into effect, a tank I is provided having an inlet or feed pipe 2 and a discharge cone 3 at the centre of the tank bottom. The feed pipe enters a tubular baffle or feed box 4, and at the upper edge of the tank there is a launder 5 for receiving the overflow which is discharged through a pipe 6.

The tank is divided into three superposed compartments 7, 8 and 9 by means of decks or partitions 10 and 11. These decks may be substantially horizontal but are preferably in the form of shallow cones with a downward slope towards the centre as shown, and they are provided with rotatable raking devices 12, 13, of known type the purpose of which is to displace the settled material or sludge towards the centre of each compartment. A third raking device 14 is provided for the lowermost compartment 9 and all the rakes are mounted upon a vertical shaft 15 which is carried upon a suitable bearing supported by a beam structure 16 extending across the top of the tank. The beam structure in question also carries an electric or other motor 17 and suitable transmission gear for rotating the shaft 15. Means indicated generally at 18 are provided for adjusting the vertical position of the shaft.

At the centre of each of the decks 10 and 11 there is an opening 19 through which the shaft 15 passes and from the edge of each of these openings there extends upwardly a tubular wall or boot 20, 21 which rises to a considerable height and is adapted to prevent the direct passage of settled material from a compartment into the one beneath it. Hence it will be seen that the height of these walls or boots will be determined by the conditions under which the thickener is desired to operate and the depth of the settled body of material in normal operation. Surrounding each of the boots 20, 21 is an inverted bell or cage-like structure 22, 23 of substantially the same depth as the boot and constituting a part of the supporting and driving structure for the rakes. Beneath the opening 19 in each of the decks there is provided a downwardly extending tubular baffle or feed box 24, 25.

Referring now to the uppermost compartment 7, a pipe 26 communicating with the lowest part of the deck 10 leads to the suction of a pump 27 located outside the tank at a suitable height which, as will appear hereinafter, is determined by the conditions in the lower compartment. The pump may be of any type but it is preferred to employ a reciprocating diaphragm pump as illustrated. The pump discharges into a receiving tank 28 which has a downflow connection 29 leading into the feed box 24 at the upper part of the middle compartment 8. The tank 28 also receives the overflow from the upper part of the lowermost compartment 9 through a pipe 30. The upper end of this pipe is provided with an adjustable telescopic tube 31 for controlling the discharge, the level of the upper end of this tube being always higher than the level in tank 28 which forms the feed to compartment 8. The reason for this is that the liquid in pipe 30 is clear solution and is therefore lighter than the mixture in feed pipe 29, and also this column of liquid balances the column of sludge represented by two compartments, whereas the column of mixture in pipe 29 balances the sludge of compartment 7 only. The mixing tank 28 is arranged at approximately the overflow level of the uppermost compartment 7.

Referring now to compartment 8, the settled material is withdrawn from the deck 11 through a pipe 32 by means of a second pump 33 and is discharged into a receiving tank 34. A supply of washing liquid 35 which may be obtained from any suitable source is introduced into the tank and the mixture is fed through pipe 36 into the feed box or baffle 25 of the lowermost compartment 9. The overflow of clarified liquid from compartment 8 is removed by the pipe 37 which has an adjustable telescopic discharge tube 38.

The settled material in the lowermost compartment 9 is raked towards the discharge cone 3 and is withdrawn through pipe 39 by a pump 40 and discharged for further treatment or disposal. The lower end of the vertical shaft 15 extends into the discharge cone 3 and a scraper device 41 carried by the rake structure is provided for clearing the cone to prevent clogging of the solid material therein. The pumps are located above the overflow level of the uppermost compartment 7.

In the operation of the apparatus it will be understood that the liquid-solids mixture which is introduced into the feed box 4 fills the whole of the three compartments including the bell structures 22 and 23, and as there is free communication between the compartments the hydraulic pressure will increase progressively from the top to the bottom of the tank. The load carried by the decks 10 and 11 will therefore be relatively small and is governed entirely by the amount of solid settled material thereon, which in turn is limited by the height of the walls 20.

The mixture fed into compartment 7 separates by sedimentation, the clarified liquid being withdrawn from the overflow launder 5 and the collected and thickened sludge being withdrawn by the pump 27. This sludge is discharged into the tank 28 together with overflow liquid from the lowermost compartment 9 and thereby undergoes a washing operation whereby it is purified by dilution of its liquid content. This mixture of sludge and wash liquid is delivered to the feed box of compartment 8 where separation again takes place, the clarified overflow being discharged elsewhere and the thickened sludge removed by the pump 33 and again washed by the introduction of any suitable wash liquid into the tank 34. The mixture is fed to compartment 9 and separated and finally purified sludge or solid material is removed by the pump 40. It will be appreciated that the overflow from the various compartments is automatic, and in the case of compartments 8 and 9 is controlled by a balancing column of liquid the height of which may be adjusted.

By using pump or other mechanical conveying means to withdraw the solid material from the various compartments the conditions may be adjusted to give a thicker sludge than is possible when sludge transfer is effected by gravity only and thus the process may be carried out more efficiently. The sludge discharged by the pumps may be observed and its consistency tested at any time, thus enabling close control to be exercised over every stage of the process. Moreover the arrangement ensures a very thorough mixing of the solids or sludge with the wash liquid. This is effected partly in the mixing tank into which the liquids are discharged from a height, and especially in the relatively long feed pipe which conveys the mixture to the succeeding sedimentation chamber. Various auxiliary means may be provided to improve the mixing action, if desired, such as baffles of various forms in the mixing tank, feed pipe, or feed box, or agitating devices. By reason of the increased efficiency of operation in both thickening and washing stages the invention enables the same work to be accomplished with smaller and cheaper plant. Thus as compared with the known washing thickener it is possible in certain circumstances to eliminate one of the thickening stages.

Another advantage of being able to observe the sludge withdrawn from each compartment is that in the case of an overload or excessive accumulation of thickened material it is immediately apparent which compartment is affected and the necessary steps can be taken to deal with the trouble. The apparatus is also relatively foolproof in that satisfactory operation is not dependent upon accurate adjustment of the overflows from the various compartments since the level of sludge or settled material in each compartment may be allowed to vary to a considerable extent.

It will be appreciated that the sludge is withdrawn from the compartments continuously and regularly by the pumps and overloads or shutdowns are not likely to occur. In the event however of an excessive accumulation of sludge in any of the compartments the trouble can be immediately located and dealt with readily by increasing the pump speed.

The particular construction of tray thickener described above is given by way of example only. If desired the separate pumps shown may be incorporated in a single pump body. Although three compartments are shown it will be understood that any number may be employed, the sludge from any one compartment being washed with overflow liquid from the next compartment but one in the series. Moreover any desired form of pump or mechanical conveying means may be employed for sludge withdrawal. The overflow from the compartments may be adjusted by means other than the telescopic tube arrangement described.

Having now particularly described and ascertained the nature of my said invention and in what manner the same is to be performed, I declare that what I claim is:

1. In an apparatus for treating a liquid solids suspension, a tank structure divided into superposed compartments and comprising a lower compartment and an upper compartment vertically superposed immediately above the lower compartment, each compartment adapted to have a sludge bed formed therein from the settling solids and having means for overflowing supernatant liquid, conduit means constituting a passage from the upper to the lower compartment and adapted in the normal operation of the apparatus to have trapped therein a substantially stationary body of settled solids; means for feeding the liquid solids suspension to be treated to the upper compartment, means for withdrawing settled solids material from the bottom of said upper compartment to a point outside the tank at a rate to maintain said trapped body of settled solids in said conduit means, means for adding a liquid diluent to said withdrawn material, and means for introducing the mixture of the withdrawn material and said diluent into said lower compartment.

2. Apparatus according to claim 1, in which the means for the withdrawal of the settled solids comprise a pump.

3. In an apparatus for treating a liquid solids suspension, a tank structure divided into superposed compartments and comprising an upper compartment, an intermediate compartment and a lower compartment all vertically superposed immediately one above the other, each compartment adapted to have a sludge bed formed therein from the settling solids and having means for overflowing supernatant liquid, conduit means between each two adjoining compartments constituting passages from the upper to the intermediate compartment and from the intermediate to the lower compartment respectively, each such passage adapted in the normal operation of the apparatus to have trapped therein a substantially stationary body of settled solids, means for feeding the liquid solids suspension to be treated to the upper compartment, means for withdrawing settled solids from the upper compartment to a point outside the tank at a rate to maintain the sludge body in the conduit means between the upper and intermediate compartments, means outside the tank for mixing the settled solids withdrawn from the upper compartment with overflowing supernatant liquid from the lower compartment, means for introducing the mixture of the withdrawn settled solids and the supernatant liquid into the intermediate compartment, means for withdrawing settled solids from the intermediate compartment to a point outside the tank at a rate to maintain the sludge body in said conduit means between the intermediate and the lower compartments, and means for introducing said settled solids withdrawn from the intermediate compartment and a liquid diluent into the lower compartment.

4. Apparatus according to claim 3, in which the means for the withdrawal of the settled solids comprise a pump.

5. In an apparatus for treating a liquid solids suspension, a tank comprising an upper compartment, an intermediate compartment and a lower compartment all vertically superposed immediately one above the other, each compartment adapted to have a sludge bed formed therein from the settling solids and having means for overflowing supernatant liquid, conduit means between each two adjoining compartments constituting passages from the upper to the intermediate compartment and from the intermediate to the lower compartment respectively, each such passage adapted in the normal operation of the apparatus to have trapped therein a substantially stationary body of settled solids, means for feeding the liquid solids suspension to be treated to the upper compartment, means for withdrawing settled solids from the upper compartment to a point outside the tank at a rate to maintain the sludge body in the conduit means between the upper and intermediate compartments, means outside the tank for mixing the settled solids withdrawn from the upper compartment with overflowing supernatant liquid from the lower compartment, means for introducing the mixture of the settled solids withdrawn from the upper compartment and overflowing supernatant liquid from the lower compartment into the intermediate compartment, means for withdrawing settled solids from the intermediate compartment to a point outside the tank at a rate to maintain the sludge body in said conduit means between the intermediate and the lower compartments, means outside the tank for mixing the settled solids withdrawn from the intermediate compartment with a liquid diluent and means for introducing the mixture of the settled solids withdrawn from the intermediate compartment and the liquid diluent into the lower compartment.

6. Apparatus according to claim 5, in which the means for the withdrawal of the settled solids comprise a pump.

VIGGO HARMS.